(12) United States Patent
Keller et al.

(10) Patent No.: US 9,132,516 B2
(45) Date of Patent: Sep. 15, 2015

(54) METHOD FOR PREPARING A BEARING ARRANGEMENT

(75) Inventors: Karl Keller, Hilchenbach (DE); Konrad Roeingh, Hilchenbach (DE)

(73) Assignee: SMS GROUP GMBH, Duesseldorf (DE)

( * ) Notice: Subject to any disclaimer, the term of this patent is extended or adjusted under 35 U.S.C. 154(b) by 338 days.

(21) Appl. No.: 13/877,929

(22) PCT Filed: Sep. 5, 2011

(86) PCT No.: PCT/EP2011/065313
§ 371 (c)(1),
(2), (4) Date: May 3, 2013

(87) PCT Pub. No.: WO2012/045538
PCT Pub. Date: Apr. 12, 2012

(65) Prior Publication Data
US 2013/0205592 A1   Aug. 15, 2013

(30) Foreign Application Priority Data
Oct. 6, 2010   (DE) .......................... 10 2010 047 471

(51) Int. Cl.
*B23P 6/00*   (2006.01)
*F16C 43/00*   (2006.01)
(Continued)

(52) U.S. Cl.
CPC . *B23P 6/00* (2013.01); *B21B 28/00* (2013.01); *B21B 31/074* (2013.01); *B21B 31/08* (2013.01);
(Continued)

(58) Field of Classification Search
CPC .......... B23P 6/00; B23P 15/003; F16C 13/02; F16C 2237/00; F16C 43/00; B21B 31/08; B21B 28/00; B21B 31/074; Y10T 29/497; Y10T 29/49726; Y10T 29/49638; Y10T 29/49696; Y10T 29/49677
See application file for complete search history.

(56) References Cited

U.S. PATENT DOCUMENTS 3,149,404 A * 9/1964 Sims .......................... 29/898.07
3,851,365 A * 12/1974 Oxlade ............................. 492/1
(Continued)

FOREIGN PATENT DOCUMENTS

| DE | 872 481 | 4/1953 |
| JP | 57-083351 | 5/1982 |
| WO | 2009/087114 | 7/2009 |

OTHER PUBLICATIONS

Schramarc: "Types of Failures of Backup Roll Assemblies," Iron and Steel Technology Bd. 2, No. 12, 2005, pp. 39-56.

*Primary Examiner* — Sarang Afzali
(74) *Attorney, Agent, or Firm* — Abelman, Frayne & Schwab

(57) ABSTRACT

The invention relates to a method for preparing a bearing arrangement for a roll journal, wherein the bearing arrangement comprises a bearing insert, with a bearing bush, and a journal bush which is mounted with bearing play in the bearing bush and can be pushed onto the roll journal. In order to extend the service life of the bearing arrangement and therefore to save costs, the method according to the invention provides, in order to eliminate scoring, for the external diameter $D_a$ of the journal bush also to be reduced below a threshold value $D_{ak}$ and at the same time for a novel bearing bush to be supplied which, with regard to its internal diameter $D_{i\,new}$, is adapted to the reduced external diameter of the bearing bush in such a way that the bearing play remains within a predefined permissible value range.

12 Claims, 3 Drawing Sheets

(51) Int. Cl.
*B21B 28/00* (2006.01)
*B21B 31/07* (2006.01)
*B21B 31/08* (2006.01)
*F16C 13/02* (2006.01)
*B23P 15/00* (2006.01)

(52) U.S. Cl.
CPC ............... *B23P 15/003* (2013.01); *F16C 13/02* (2013.01); *F16C 43/00* (2013.01); *F16C 2237/00* (2013.01); *Y10T 29/497* (2015.01); *Y10T 29/49638* (2015.01); *Y10T 29/49668* (2015.01); *Y10T 29/49696* (2015.01); *Y10T 29/49726* (2015.01)

(56) References Cited

U.S. PATENT DOCUMENTS 6,468,194 B2 * 10/2002 Wojtkowski et al. ............. 492/1
7,386,939 B2 * 6/2008 Di Giacomo ............. 29/898.07
8,246,250 B2 8/2012 Keller

* cited by examiner

METHOD FOR PREPARING A BEARING ARRANGEMENT

RELATED APPLICATIONS

This application is a National stage application of International application PCT/EP2011/065313 filed Sep. 5, 2011 and claiming priority of German application DE 10 2010 047 471.1 filed Oct. 6, 2010.

BACKGROUND OF THE INVENTION

1. Field of the Invention

The invention relates to a bearing arrangement and a method of preparing a bearing arrangement for a roll journal of a roll for rolling metal rolled stock such as, e.g., slabs or metal strips. The bearing arrangement includes a bearing insert with a bearing bush and a journal bush which is located in the bearing bush with a bearing clearance and is pushable over the roll journal. The invention relates in particular to bearing arrangements for working and back-up rolls in rolls mills of the metallurgical industry.

2. Description of the Prior Art

Such bearing arrangements and methods of their preparation are basically known in the state-of-the art, see, e.g., R. S. Schrama in "Iron and Steel Technologies," December 2005, "Types of Failures of Back-up Roll Assemblies."

A known bearing arrangement and a known method of its preparation will be described in detail with reference to FIGS. 1-4.

FIG. 1 shows a known bearing arrangement 100 for supporting a roll 200. The roll includes a roll body 220 and two roll journal 210. Each of the roll journals 210 is supported by a separate bearing arrangement 100. Each of the bearing arrangements includes a bearing housing also called a bearing insert.

FIG. 2 shows a detailed construction of the bearing arrangement. Thus, the bearing arrangement 110 includes an annular bearing bush 112 for receiving the roll journal 210 and which is arranged in the insert. The bearing arrangement 100 includes, in addition to the bearing bush, an annular journal bush 120 that is pushed on the roll journal 210. In order to prevent rotation of the roll journal 210 in the journal bush 120, there are provided two keys 142, 144 between the journal bush 120 and the roll journal 210. A pressure shoulder ring 130 prevents a sidewise displacement of journal bush from the journal during the rolling operation.

The journal bush 120 has a radial elevation in form of a band 122 at its end remote from the roll body. This annular band has a certain axial extension for taking up forces which are generated, e.g., during pulling of the journal bush 120 from the roll journal. To this end, the insert, together with the bearing bush 112, is pulled in the axial direction away form the roll body 220, with the insert or the bearing bush 112 engaging the band and, in this way, pulling the journal bush in the axial direction from the roll journal, in the axial direction meaning in the direction of the longitudinal axis of the roll 200.

In FIG. 2, the force distribution acting on the bearing arrangement during the rolling operation is shown with arrows.

FIG. 3 shows a detailed view of the bearing arrangement in an initial or new condition. FIG. 3 shows a bearing clearance between the outer diameter $D_a$ of the journal bush and the inner diameter Di of the bearing bush. In a new condition, this bearing clearance lies, dependent on the type of the bearing arrangement, in an allowable value region of 0.5 to 1.5% of an initial outer diameter of the journal bush.

During rough rolling operation, the bearing arrangements are subjected to strong mechanical and thermal loads, and, as result, wear off. The wear phenomenon is shown in form of drag lines on or damages of the surface of the inner side of the bearing bush and an outer and inner side of the journal bush. The repair of such bearing arrangements is a conventional practice. Traditionally, both the journal bush and the bearing bush are repaired. Traditionally, the repair of the roll journal 120 includes the following steps: machining the outer side of the journal bush 120 by turning, milling, or grinding, whereby the outer diameter of the journal bush is reduced to such an extent that the drag lines or damages are no more visible. In the same way, the inner side of the journal bush can be treated, which increases the inner diameter. However, the drawback of the increase of the inner diameter of the journal bush consists in that at a later re-use of the journal bush, it is pushed on the roll journal further than originally. The drawback of this consists in that a seal between the roll body and the insert, not shown in FIG. 4, would be compressed in an unacceptable degree. Therefore, it becomes necessary to shorten the journal bush at its end adjacent to the roll body by an amount C, so that the journal bush 120 could not be displaced on the roll journal further than in a new condition.

The drawback of reduction of inner diameter of the journal bush 120 at its end remote from the roll neck consists in that the band 122 of the journal bush 120 rises too close to the bearing bush. A certain minimum distance A should be retained between the band 122 and the bearing bush 112. In order to retain this distance A, with an increase of the inner diameter of the journal bush, the band 122 should be reworked, i.e., to be so reduced in its axial extension that the minimum distance A is reinstated. However, the axial extension of the band 122 should not fall below a minimum amount to insure the necessary stability of the band against the above-mentioned sidewise displacement of the journal bush from the roll journal.

A further drawback of the increase of the inner diameter of the journal bush consists in that the end side of the journal bush remote from the roll body becomes spaced by a certain amount from the press shoulder ring 130 when the journal bush is pushed over the roll journal and, as a consequence, the pressure shoulder ring should correspondingly also be pushed further.

Manufacturing of the bearing bush with a coating of a bearing metal, preferably, while metal is discloses in the prior art, e.g., in EP 1 151 145 B1.

The repair of the bearing bush includes the following steps:

Removing a layer of bearing metal adjacent to the journal bush, e.g., white metal layer, in order to remove the drag lines and damages. The white metal layer is usually comparatively thin in the initial condition of the bearing bush so that it can be removed only completely. As a rule, during the removal of the white metal layer, disadvantageously, a thin layer of a carrier material remote from the journal bush, usually steel of which the bearing bush primarily consists, is also removed with the white metal layer, whereby the bearing bush is weakened with each repair to a certain degree. After the removal of the white metal layer, a new layer of white metal is put on the inner surface of the bearing bush 112 on the old/previous predetermined nominal diameter $D_{i\ old}$, this time with a greater thickness of the white metal layer than the thickness of the removed old material layer. The greater thickness layer of the new white metal compensates the removed carrier metal. Though, as discussed, the inner diameter $D_{i\ old}$ of the bearing bush remains unchanged after putting of the new bearing metal layer for purposes of interchangeability, in particular, does not become smaller, the outer diameter $D_a$ of the journal bush is reduced as a result of removal, so that the bearing clearance increases with each removal of outer side of the journal bush. The bearing clearance between the white metal layer and the outer side of the journal bush should not be greater than 1.7% of the original outer diameter of the journal bush after treatment. As soon as the maximal allowable value of 1.7% for the bearing clearance is reached or the inner diameter of the journal bush exceeds a predetermined threshold, the journal bush should not be further repaired but should be replaced.

Traditionally, the journal bush is replaced after two-three repairs, which is usually associated with high costs for the user and a large consumption of resources, while the journal bush usually must be scrapped.

The thickness of the bearing metal layer, in particular, white metal layer, in the bearing bush has a thickness threshold $S_D$ that should not be exceeded. This is because the white metal is substantially weaker than, e.g., carrier material of the bearing bush on which the white metal is put. The white metal layer can be only increased so far that the load requirement to the bearing arrangement can be met with, simultaneously, retaining the predetermined nominal diameter.

For this reason, such repair of a bearing bush is not usually often, but is rather made at most two-three times.

SUMMARY OF THE INVENTION

Proceeding from this state of the art, the object of the invention is to provide a method of preparing a bearing arrangement which would enable a longer use of the high-valued, rather expensive journal bush.

The method is characterized by following two steps:
machining the journal bush with a first time reduction of its outer diameter $D_a$ below a threshold value $D_{ak}$, with this reduction, the bearing clearance between the inner diameter $D_{i\ old}$ of the previous bearing bush and the reduced below its threshold value, outer diameter of the journal bush would not remain any more in an allowable value region, and
providing a new bearing bush with the inner diameter $D_{i\ new}$ being so adapted to the reduced outer diameter of the machined journal bush that the bearing clearance between the inner diameter $D_{i\ new}$ of the new bearing bush and the reduced below its threshold value $D_{ak}$, outer diameter of the machined journal bush has a value in a predetermined allowable value region.

The advantage of the claimed method consists in that the high-value journal bush, which is more costly than the bearing bush, is repaired at least one time, typically several times, and can be used again. Thereby, noticeable costs saving are provided to the user, and a noticeable economy of resources for the environment in comparison with traditional usual use of the journal bush as scrap. The re-use of the journal bush in made possible by a provision of a new bearing bush which is so formed with respect to its inner diameter $D_{i\ new}$ that the bearing clearance lies in an allowable value range. I.e., the nominal inner diameter $D_{i\ new}$ of the new bearing bush, as a rule, somewhat smaller than the nominal diameter $D_{i\ old}$ of the previous bush in order that with the further reduced outer diameter of the journal bush, the bearing clearance is retained in the allowable value range.

Thus, the so formed, according to the invention, pair consists of the machined journal bush with an outer diameter reduced below the threshold value $D_{ak}$ and a new bearing bush, which provides a new life cycle for the bearing arrangement with an allowable bearing clearance. The new life cycle typically enables again multiple repairs of both the journal bush and of the new bearing bush. Altogether, in this way, in particular, the service life of the journal bush can be doubled.

The threshold value $D_{ak}$ is defined as:

$$D_{ak} = D_{a\ initial}(1-0.0007),$$

where $D_{a\ initial}$: initial outer diameter of the journal bush before its first time use. According to first embodiment, the new bearing bush would be formed with such inner diameter that the initial bearing clearance of the pair new bearing bush/journal bush with $D_a$ new ($D_a$ new=outer diameter of the journal bush at the first time reduction below $D_{ak}$) corresponds to the allowable value of the bearing clearance in the initial new condition of the bearing arrangement (the previous bearing bush in the initial condition/journal bush in the initial condition). The bearing metal layer of the new bearing bush can still be held particularly thin at a corresponding thicker steel carrier.

The allowable initial value of the bearing clearance lies in a value range of 0.3 to 1.5% of the initial nominal diameter of the journal bush in the initial position, dependent on type of use. This value range for the bearing clearance is valid for both for the pair previous bearing bush/journal bush in the initial condition and for the pair new bearing bush/journal bush with $D_a$ smaller than $D_{ak}$ for the first time. Also is allowable, for a respective type of use, the increase of the bearing clearance to 1.7 times of the original initial value of the bearing clearance which is caused by a later repair, in particular, by reduction of the outer diameter of the journal bush.

The increase of the bearing clearance above 1.7 times or, which is synonymous, a further reduction of the outer diameter $D_a$ of the journal bush below a second threshold value $D_{ak2}=D_a$ new $(1-0.0007)$, with the essentially unchanged inner diameter of the new bearing bush, are not any more allowable.

Advantageously, the new bearing bush is formed with a steel carrier ring that it thicker than the steel carrier ring of a previous bearing bush that was repaired at least once.

As discussed, the bearing metal layer of the new bearing bush can, with a steel carrier ring having a slightly greater thickness, advantageously have, in a new condition at a given nominal inner diameter $D_{i\ old}$, only a minimal thickness comparable with the thickness of the bearing metal layer of the previous bearing bush. In particular, the bearing metal layer of the new bearing bush can be noticeably thinner than the thickness of the bearing metal layer of the previous bearing bush after multiple repairs.

The machining of the journal bush includes typically the steps described above with reference to FIG. 4. This machining of the journal bush can already take place one or several times before carrying the inventive process, i.e., before a first time reduction of the outer diameter of the journal bush to a value beneath the threshold value. With that, the reduction of the outer diameter of the journal bush is always carried out only gradually, but never so far that the threshold value $D_{ak}$ falls. The critical threshold $D_{ak}$ is so defined that at its lower deviation, the bearing clearance, which would remain between the inner diameter of the previous bearing bush and the outer diameter of the journal bush reduced below the threshold value $D_{ak}$, would lie above an allowable value range, in particular, a predetermined allowable maximal value would be exceeded.

According to the inventive method, it can be advantageously provided that the journal bush is lengthen in the axial direction at its end side remote from the cylinder, i.e., from roll body, e.g., by providing a ring at the remote end side. This axial lengthening provides advantageously for form-or force-locking between the end side and the pressure shoulder ring also at an increased inner diameter of the journal bush. The ring advantageously is replaceably mounted.

Advantageously, the above-discussed post-treatment of the journal bush can take place at least once but typically up to three times, without falling below the new threshold value, after the first time reduction of the outer diameter to a value below the old threshold value.

Advantageously, the new bearing bush can be repaired several times and used again. The repair of the previous bearing bush and the repair of the new bearing bush are carried out typically according to the same plan which includes the following steps discussed above with reference to FIG. 4:

Removal of a provided on the inner side of the bearing bush, bearing metal layer, usually white metal, adjacent to the journal bush, optionally, together with a remote from the journal bush, thin layer of a carrier material of the baring metal layer or white metal layer; and Placing a new bearing metal layer with a typically greater layer thickness than the removed material layer, onto the inner side of the bearing bush, so that the initial inner diameter $D_{i\ new}$ of the new bearing bush is restored again. The so repaired bearing bush remains replaceable.

Advantageously, the layer thickness of the newly restored bearing metal layer always lies below a thickness threshold $S_D$. This is important because the newly placed material, preferably, white metal, is relatively light and, therefore, can only meet limited load requirements. A two large thickness of the material layer above the thickness threshold is not any more suitable for meeting load requirements of the bearing arrangement. Finally, it should be mentioned that post-treatment, the reduction of the outer diameter, the increase of the inner diameter, removal of the material is carried out by grinding, milling, or machining.

DETAILED DESCRIPTION OF THE PREFERRED EMBODIMENT

Figure 1:
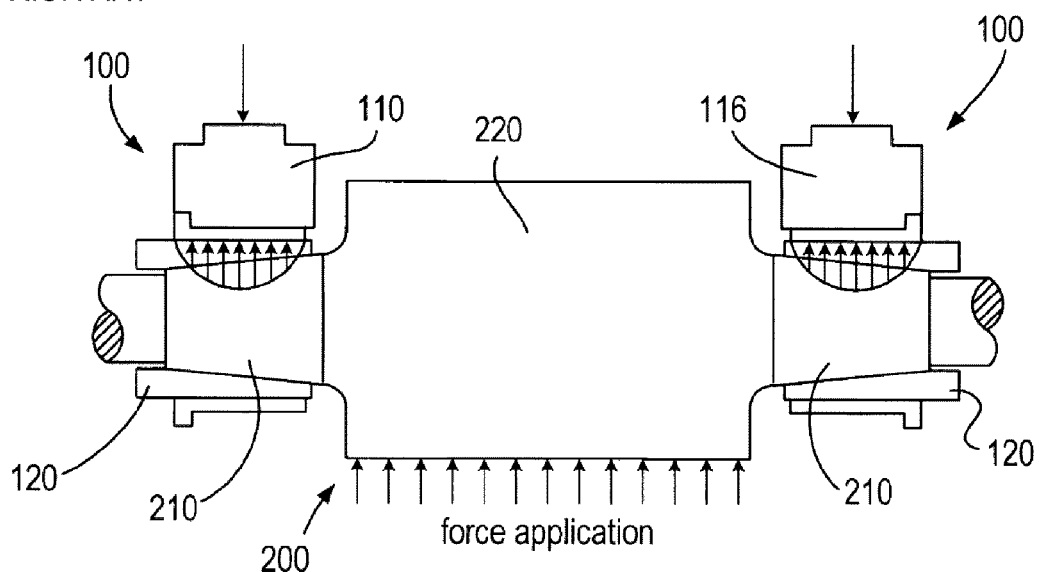
FIG. 1 shows a bearing arrangement with a roll according to the state of the art.
Figure 2:
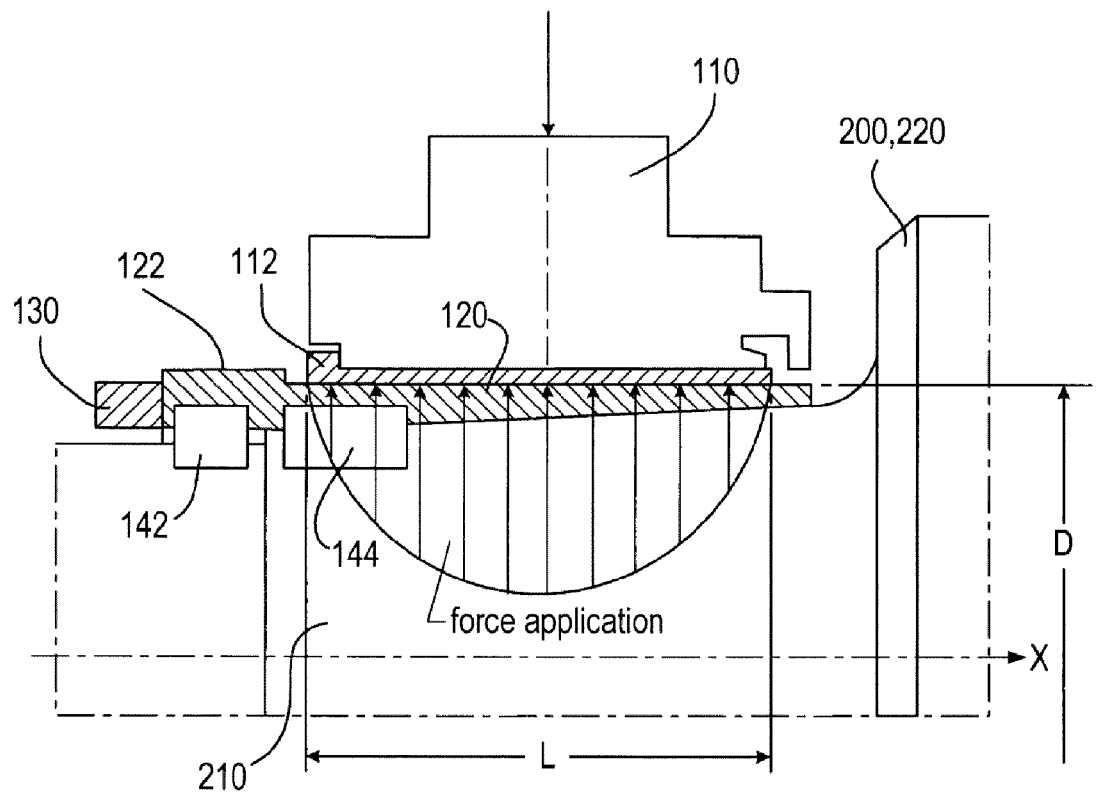
FIG. 2 shows a first detailed view of the bearing arrangement according to the state of the art.
Figure 3:
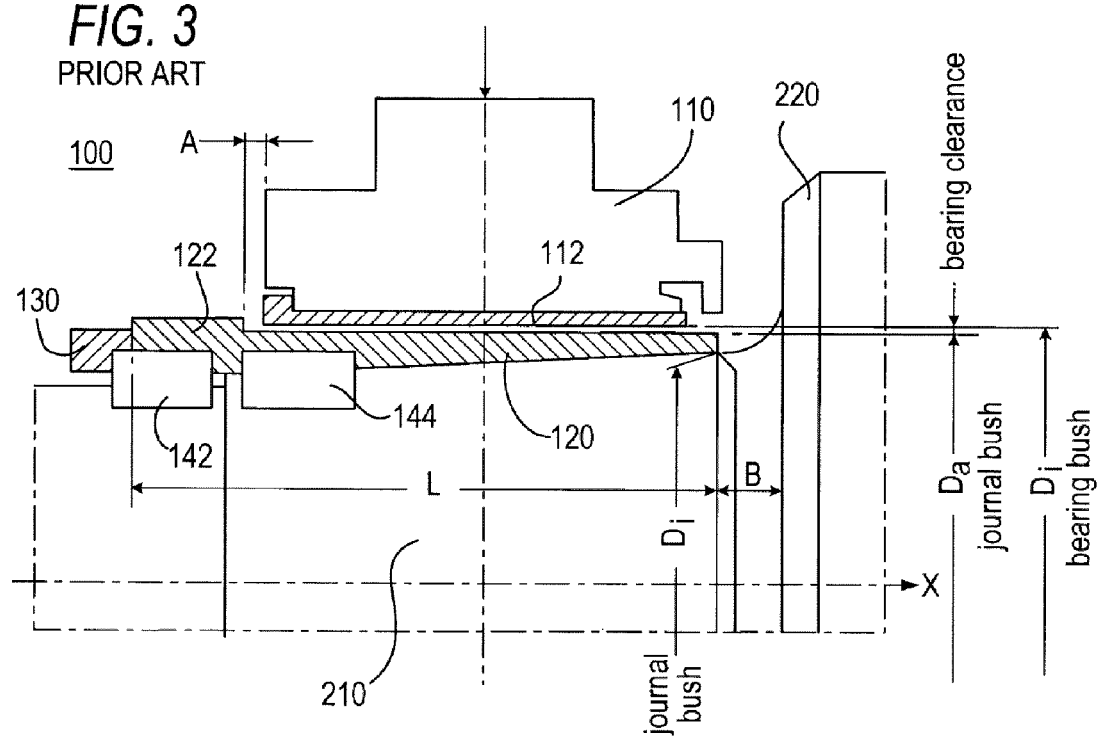
FIG. 3 shows a second detailed view of the bearing arrangement according to the state of the art.
Figure 4:
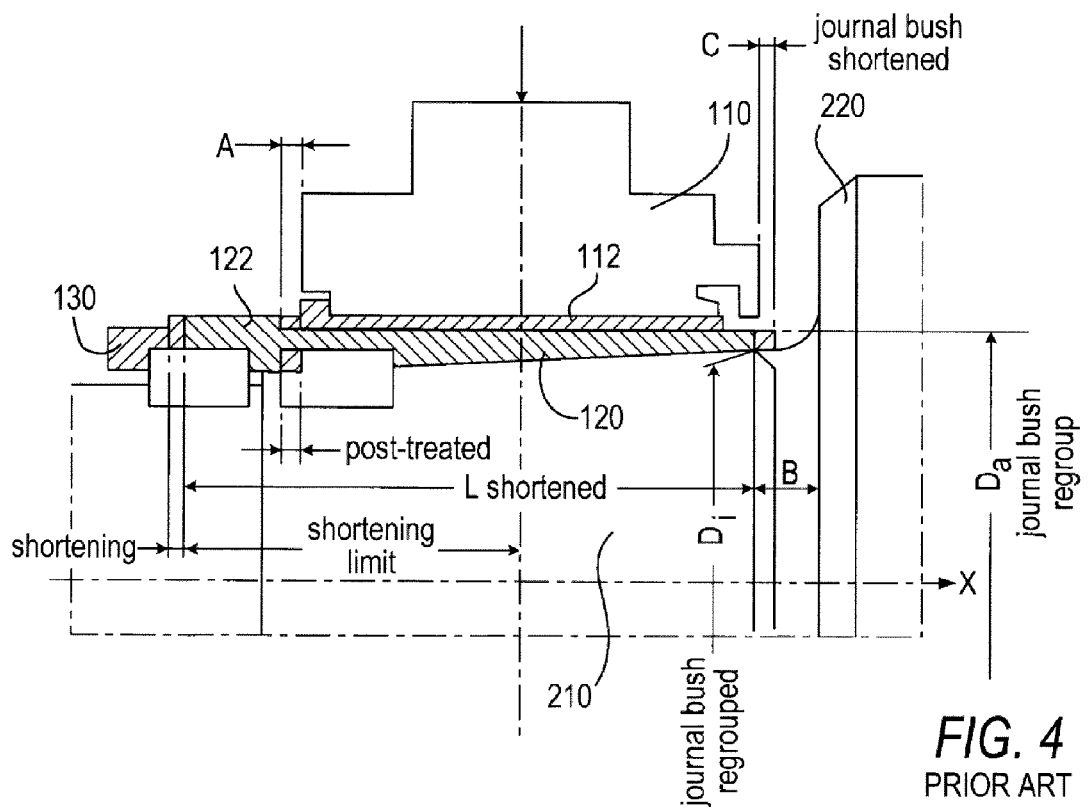
FIG. 4 shows changes in the bearing arrangement resulting from carrying out a repair according to the state of the art.

In all the figures, the same technical features are designated with the same reference numerals.

The invention will be described in detail below with reference to FIGS. 5 and 6.

Figure 5:
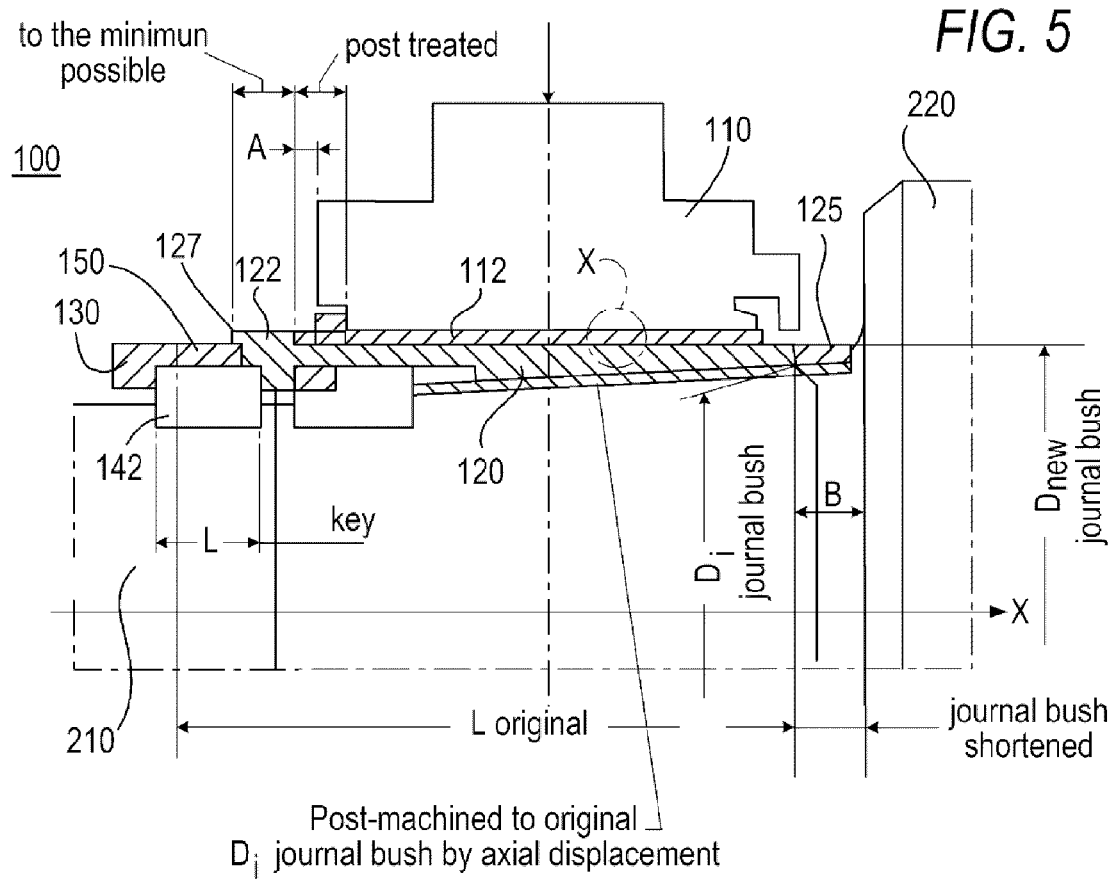
FIG. 5 shows a bearing arrangement after carrying out the inventive method.

FIG. 5 shows a bearing arrangement 100 after carrying out the inventive method, i.e., with a new bearing bush 112' and post-treated journal bush 120.

The inventive method is directed to providing for a second life of a broken and, typically, already multiple times repaired, bearing arrangement and, in particular, of a journal bush. The inventive method sets forth a process for a worn out bearing arrangement in which the outer diameter of the journal bush 120, as a result of a first post-treatment, is noticeably reduces in comparison with a new condition. The bearing clearance between the inner diameter of the bearing metal layer, i.e., between approximately the inner diameter of the bearing bush and the reduced outer diameter of the journal bush 120 still lies, before carrying out the inventive process, i.e., after the last post-treatment, typically, but not necessarily, in an allowable value region; i.e., the bearing clearance is still not greater than 1.7 times of the initial value of the bearing clearance for a respective application.

Further removal of journal bush within the frame of further machining/repair—while maintaining the previous nominal inner diameter. $D_{i\ old}$ of the previous bearing bush would necessarily lead to an unallowable large bearing clearance. However, even at that condition, the journal bush can be repaired at least one more time but typically, up to three times.

Therefore, the inventive method contemplates to post-treat the journal bush one more time, i.e., to eliminate draglines in/on its surface by removal of material. As a result, the outer diameter of the journal bush would be reduced below the above-mentioned threshold value $D_{ak}$ of the outer diameter for the first time.

Additionally, as shown in FIG. 5, there is provided a new bearing bush 112' with the bearing metal layer on its surface being to form that the bearing clearance for a respective application is reduced by an arbitrary amount so that it lies within the allowable value range. For the new bearing bush 112', the new nominal diameter, which is defined as $D_{i\ new} < D_{i\ old}$, is so selected that the new bearing clearance lies, despite the further reduction of the outer diameter of the journal bush, lies in the allowable value region from 0.3 to 1.5% of the outer diameter $D_a$ new of the journal sleeve reduced for the first time below $D_{ak}$. The outer carrier material 114, e.g., steel in the new bearing bush 112' preferably is thicker then in the previous bearing bush. The threshold value $D_{ak}$ for the outer diameter of the journal bush is defined as $D_{ak} = D_{a\ initial}(1-0.0051)$, where $D_{a\ initial}$ is the nominal outer diameter of the journal bush in the new condition before the first use.

Figure 6:
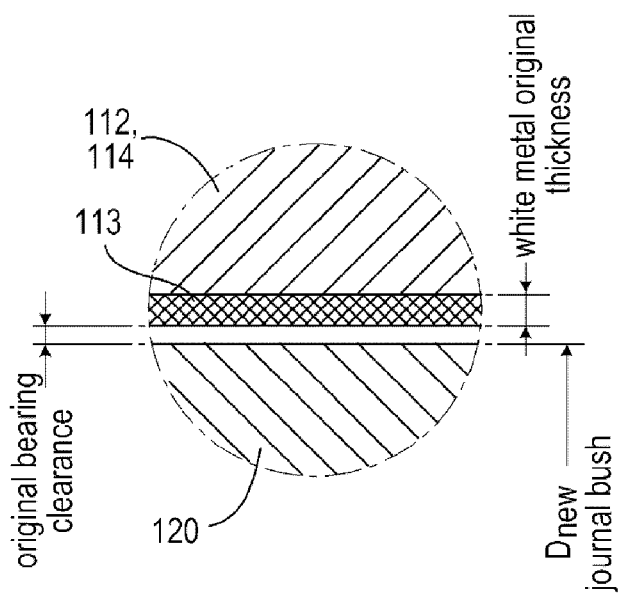
FIG. 6 shows a detailed view of FIG. 5.

The bearing metal layer is reduced, as shown in FIG. 6, to the smallest thickness, as, e.g., was the case in the new condition of the previously used bearing bush. This layer thickness of the bearing metal in the new bearing bush is anyway noticeably smaller than the predetermined thickness threshold, and is preferably so thin than later a multiple repair of the bearing bush is possible, whereby, as discussed above, a gradual increase of the thickness can take place, without the thickness of the bearing metal layer exceeding the thickness threshold.

As far as necessary, the post-treatment of the bearing bush according to the inventive method includes also the following steps:

post-machining of the inner side of the journal bush, whereby the inner diameter of the journal bush is increased, shortening the axial length of the journal bush at its side 125 adjacent to the roll cylinder so that upon the journal bush with an increased diameter being pushed onto the roll journal, a seal, which is located between the bearing arrangement and the roll body, is not excessively compressed. Further, the radially outwardly extending band 122 can be reduced in its axial extent at the end of the journal bush remote from the roll at the end side of the band adjacent to the bearing bush in order to insure the necessary minimal distance A to the end side of the bearing bush remote from the roll. In addition, it can become necessary to provide for material removal in the region of the keys 142, 144 to insure that they can be still inserted. In any case, the keys 142, 144 must be adequately covered between the pressure shoulder ring 130 and the journal bush 120.

FIG. 5 shows with hatchings a complete above-discussed material removal of the inner diameter of the journal bush, of roll side end surface, of the band 122 as well as in the key region.

Finally, the inventive method contemplates that at the inevitable removal at its end side 125 adjacent to the roll body, the journal bush is lengthened to its original length L to insure a proper abutment of the pressure shoulder ring 30. To this end, an annular ring having the necessary length is provided on the journal bush end side 127 remote from the roll, e.g., by shrinking. The ring 150 has a rectangular profile in order to take into account the key 142.

LIST OF REFERENCES

100 Bearing arrangement
110 Bearing insert
112 Previous bearing bush
112' New bearing bush
113 Bearing metal layer
114 Carrier material
120 Journal bush
122 Journal bush band
130 Pressure shoulder ring
142 First key
144 Second key
150 Ring
200 Roll
210 Roll journal
220 Roll body (roll barrel)
$D_{a\ initial}$ outer diameter of the journal bush in the initial new condition before the first use.
$D_a$ actual outer diameter of the journal bush
$D_{a\ new}$ outer diameter of the journal bush after a first time reduction below $D_{ak}$, i.e., at the start of the second life of the journal bush
$D_{ak}$ critical threshold for the outer diameter of the journal bush
$D_{ak2}$ second critical threshold for the outer diameter with $D_{ak2}=D_a$ new $(1-0.0007)$
$D_{i\ old}$ inner diameter of the previous bearing bush with a bearing metal layer
$D_{i\ new}$ inner diameter of the new bearing bush with the metal bearing layer
$S_D$ thickness threshold for the bearing metal layer.

The invention claimed is:

1. A method of preparing a bearing arrangement for a roll journal of a roll for rolling roll goods, wherein the bearing arrangement includes a bearing insert with a bearing bush and a journal bush pushable onto the roll journal and located in the bearing bush with a bearing clearance between an inner diameter $D_{i\ old}$ of the bearing bush and an outer diameter $D_a$ of the journal bush being in an allowable value region,
   wherein the method is characterized by the following steps:
      machining the journal bush with a first time reduction of its outer diameter $D_a$ below a threshold value $D_{ak}$, whereby the bearing clearance between the inner diameter $D_{i\ old}$ of the bearing bush and a reduced below its threshold value, outer diameter of the journal bush is not any more in the allowable value region, and
      replacing the bearing bush with a new bearing bush having a new inner diameter $D_{i\ new}$ such that a new bearing clearance between a new inner diameter $D_{i\ new}$ of the new bearing bush and the reduced below its threshold value $D_{ak}$, outer diameter of the machined journal bush has a value lying in a predetermined allowable value region.

2. The method according to claim 1, characterized in that post-treatment of the journal bush has the following steps:
   if necessary, machining the journal bush on its inner side, whereby its inner diameter is reduced; and, if necessary,
   shortening the journal bush on its barrel side end surface in its axial length; and
   if necessary, reducing an axial extension of a radially outwardly extending band at an end of the journal bush remote from the barrel at the end side of the annular band adjacent to the bearing bush.

3. The method according to claim 2, characterized in that the post-treatment of the journal bush takes place at least one time already before the first time reduction of the outer diameter of the journal bush to a value below the threshold.

4. The method according to claim 3, characterized in that the post-treatment of the journal bush takes place at least one more time after the first time reduction of the outer diameter of the journal bush to a value below threshold.

5. The method according to claim 2, characterized in that the journal bush is lengthened in an axial direction at its end surface remote from a roll barrel by shivering a ring in the barrel-remote end side.

6. The method according to claim 2, characterized in that in the post-treatment, reduction of the outer diameter or removal of material is carried out by grinding, milling or machining.

7. The method according to claim 1, characterized in that after the new bearing bush becomes available, if necessary, at least one repair of the new bearing bush takes place.

8. The method according to claim 7, characterized in that the at least one repair of the new bearing bush has the following steps:
   removal of a bearing metal layer adjacent to the journal bush on the inner side of the new bearing bush; with a thin layer of the carrier material of the bearing metal layer remote from journal bush, and putting on a new bearing metal layer with a such layer thickness that the inner diameter Di new of the new bearing bush is again provided.

9. The method according to claim 8, characterized in that the layer thickness of the newly provided bearing metal layer lies below a thickness threshold ($S_D$).

10. The method according to claim 1, characterized in that the predetermined allowable value region for the new bearing clearance corresponds to an allowable value region of the new bearing clearance in an initial new condition of the bearing arrangement.

11. The method according to claim 10, characterized in that the allowable value region amounts to 0.3-1.5% of the outer diameter of the journal bush reduced below the threshold value $D_{ak}$ for the first time.

12. The method according to claim 1, characterized in that the new bearing bush is formed with a steel carrier ring which is thicker than in the bearing bush, and with a bearing metal layer on the inner side of its bore, wherein the bearing metal layer of the new bearing bush has initially somewhat the same thickness as the bearing metal layer of the bearing bush in the new condition.

* * * * *